July 6, 1948.  W. B. LARSON  2,444,453
BINOCULAR MOUNT
Filed Jan. 10, 1947  2 Sheets-Sheet 1
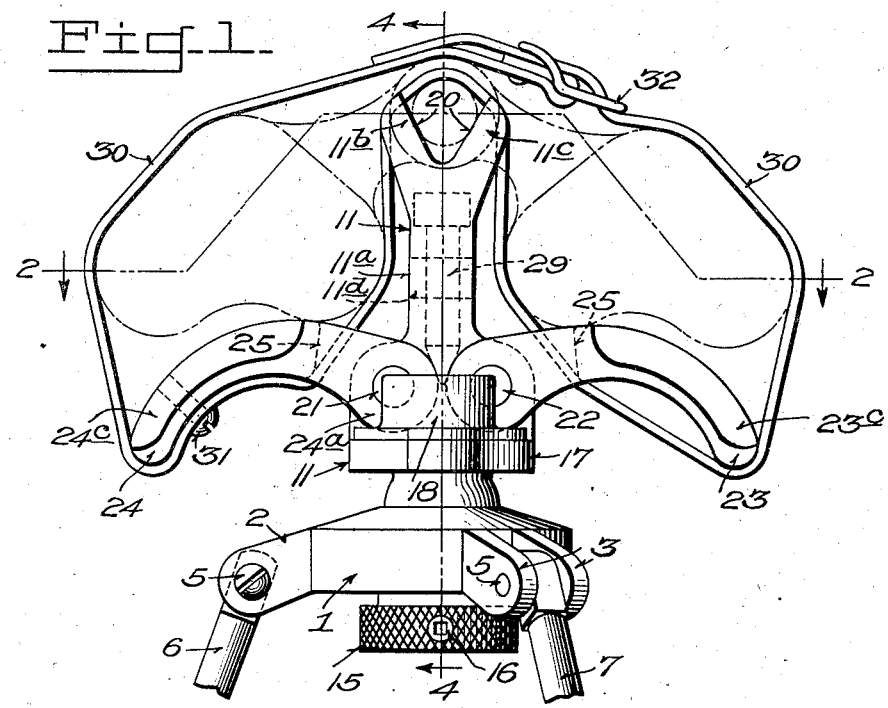
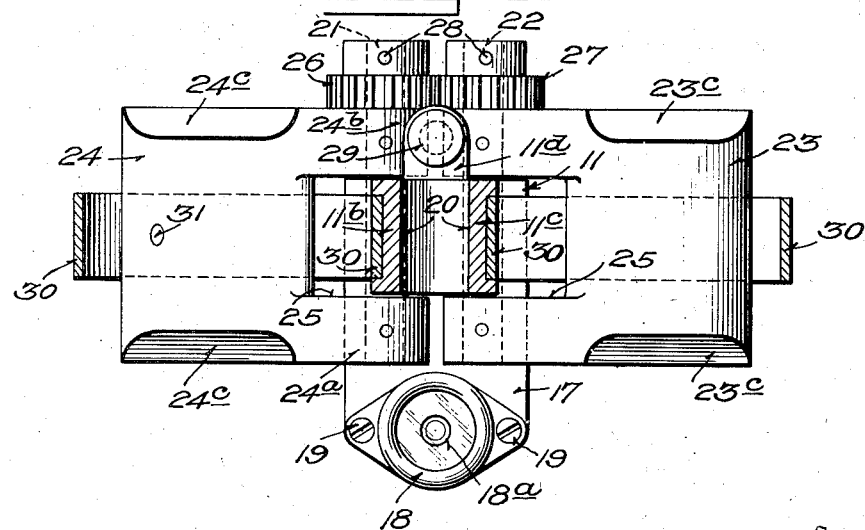
Inventor
WILLIAM B. LARSON, July 6, 1948.　　　　　W. B. LARSON　　　　　2,444,453
BINOCULAR MOUNT
Filed Jan. 10, 1947　　　　　　　　　　　　　2 Sheets-Sheet 2
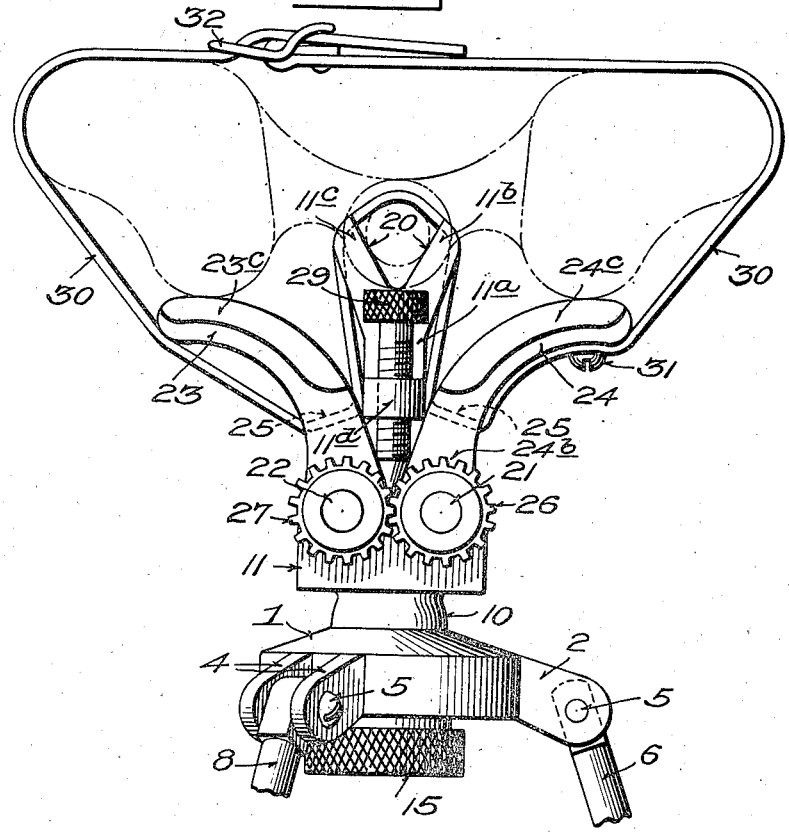
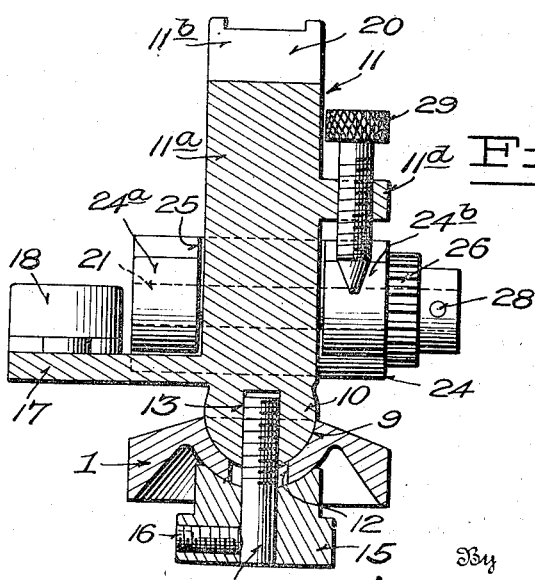
Inventor
WILLIAM B. LARSON,
By
D. J. Kessenich, J. H. Church & F. E. Thibodeau
Attorneys Patented July 6, 1948

2,444,453

UNITED STATES PATENT OFFICE 2,444,453

BINOCULAR MOUNT

William B. Larson, Glen Ridge, N. J.

Application January 10, 1947, Serial No. 721,327

8 Claims. (Cl. 88—36)

(Granted under the act of March 3, 1883, as amended April 30, 1928; 370 O. G. 757)

The invention described in the foregoing specification and claims may be manufactured and used by or for the Government for governmental purposes without the payment to me of any royalty thereon.

This invention relates to a mount or support for a pair of binoculars. While intended more particularly for military or naval use, it will be obvious that the support has many other uses where a rigid, positive, and rapidly adjustable support for a pair of binoculars is desired.

Accordingly, the invention has for its main objects, (1) the provision of a support for a pair of binoculars that is rapidly and uniformly adjustable to firmly engage and support the binoculars for all interpupillary adjustments thereof; (2) the provision of a binocular support that can be adjusted to maintain the height of the oculars and objectives a fixed distance above datum for all interpupillary adjustments thereof; (3) the provision of a binocular support that may be quickly and accurately leveled to ascertain correct angles of sight of a target for firing on said target; (4) the provision of a support that, once adjusted, can be readily locked in the desired position of adjustment and returned to said position as desired, despite subsequent adjustments; and (5) the provision of a binocular mount that positively holds a pair of binoculars in any given position of interpupillary adjustment.

Other objects and advantages of my invention will become apparent as the description advances.

In the drawing wherein like reference numerals identify corresponding parts throughout;

Figure 1 is an elevation of the assembled support showing in dotted lines the position of a pair of binoculars secured to and supported thereon, said binoculars being adjusted for substantially their minimum interpupillary distance.

Figure 2 is a plan view taken on the line 2—2 of Figure 1, showing the bubble tube support and the mechanical interconnection between the right and left supporting wings, Figure 3 is an elevation of the assembled support looking in a direction opposite to that of Figure 1 and showing the wing-locking means, and, in dotted lines, a second position of a pair of binoculars when adjusted for substantially maximum interpupillary distance, and Figure 4 is a section taken upon a plane indicated by the line 4—4, Figure 1, and showing in detail the bubble tube support, the leveling head construction and the locking screw.

Referring in detail to the drawings, I identifies a leveling head base generally circular in shape and having three pairs of equally spaced arms 2, 3, and 4 radially extending from its periphery. Each pair of arms is drilled to form aligned holes, the hole in one arm being tapped to receive the threads of a pivot screw, such as 5, Figures 1 and 3. A respective one of three legs 6, 7 and 8 is pivoted upon screws 5 between each pair of arms. Each leg has a snug fit between its pair of arms so that by turning the screws, the friction between each leg and its pair of arms may be adjusted. If and when desired, this friction may be made so great as to, in effect, lock the legs in their desired positions of pivotal adjustment upon the screws.

The base I has a central, substantially hemi-spherical socket 9 adapted to receive, with a smooth fit, the ball projection 10 of a leveling head 11. The base has a hole 12 therethrough centrally of socket 9. The projection 10 has a central threaded aperture 13 to receive a screw 14 of smaller diameter than hole 12. A knob 15 is drilled to receive the shank of screw 14 with a snug fit. A set screw 16 threads into a radial hole in knob 15 and secures the knob and screw 14 rigidly together. Thus, by turning knob 15, screw 14 may be loosened after which head 11 may be rotated and angularly adjusted relatively to base 1. Tightening of screw 14 then locks the parts in their desired position of relative adjustment. From Figure 4 it will be noted that knob 15 has a spherical depression to receive a mating convex surface of base 1 to thereby reduce bearing pressure and increase the friction holding the base and head in adjusted position.

The leveling head 11 includes a standard 11a extending upwardly from projection 10 and terminating in diverging arms 11b and 11c forming a V-groove or channel 20 therebetween adapted to receive and support the pivot joint of a pair of binoculars. A ledge or shelf 17 extends laterally from the rear side or face of standard 11a and is adapted to support a circular bubble level 18 of conventional construction and secured thereto by screws 19. The level is so related to the channel 20 that when the bubble of 18 is centered relatively to a circular mark or indicium 18a on the glass cover of the level, channel is known to be horizontal. Since the optical axes of the binoculars are parallel with the pivot axis between the right and left halves, adjustment of head 11 to level position as indicated by level 18, also assures that the lines of sight of a pair of binoculars supported thereby, is horizontal.

At its right and left portions, slightly above the plane of shelf 17, the head 11 is provided with horizontally spaced bores parallel to the elements forming channel 20. As clearly shown at Figure 1 the axes of these bores are also symmetrical with respect to a normally vertical plane through the base of channel 20. Pivot pins 21 and 22 have a smooth bearing in the respective bores.

Right and left supporting wings 23 and 24 are substantially identical in construction so that a description of one will suffice. Wing 24, then, has a notch 25 at its inner end forming spaced lugs 24a and 24b. These lugs have aligned holes to snugly receive pin 21. The confronting surfaces of the notch are parallel and are spaced apart to receive between them with the minimum practical clearance, the parallel faces of standard 11a. Each pair of lugs may be conveniently secured to its shaft by pins as indicated upon Figure 2.

As will be noted from Figure 2, shafts 21 and 22 extend forwardly from the adjacent lugs such as 24b, a sufficient distance to receive respective identical spur gears 26 and 27 which intermesh. Each gear is secured, as by pins 28, to a respective shaft. Thus, the wings are interconnected for equal and opposite pivotal movement. The original assembly is such that the wings are at all times symmetrical with respect to the plane normal to the paper, indicated by line 4—4, Figure 1. As shown at Figure 1, the upper surface of each wing is generally that of a 90° portion of a right circular cylinder each having its elements parallel to the axis of its pivot pin 21 or 22. The contour of the lower surfaces of the wings may generally conform to that of the upper surface. The outer edge of each wing is conveniently rounded and their arcuate edges may be chamfered as indicated at 23c and 24c, Figure 2.

Standard 11a, at its forward side has a lug 11d projecting therefrom. A set screw 29 is threaded into a normally vertical tapped hole in the lug, symmetrically positioned between the wings so that the tapered end of the screw, when turned home, engages both wings and prevents upward pivotal movement thereof beyond an angle determined by the adjustment of the set screw. The purpose of this construction will be explained in connection with the description of the operation and use of the invention. While I have shown head 11 as formed from a solid piece of material, it will be clear that shelf 17 and lug 11d may be formed independently of the standard 11a and secured thereto as by screws. In a model actually built and successfully operated, shelf 17 and ball 10 were formed integrally and connected with standard 11a by machine screws.

A strap 30 is used to secure the binoculars firmly in position upon the support. To prevent loss, the strap may be secured to the under surface of one wing by a screw 31, as indicated at Figures 1 and 3. From this screw, the strap passes upwardly between the pivot lugs of wing 24, between the right and left halves of the binoculars thence over and in contact with the pivot between the two halves, downwardly between the pivot lugs of wing 23, thence around its outer end, and upwardly over and about the two halves of the binoculars, to wing 24. A "pinch" type clamp or buckle 32 enables precise adjustment of the effective length of the strap. From Figure 4 it will be noted that the tops of arms 11b and 11c are notched to accommodate the strap and prevent lateral displacement thereof.

In use, the binoculars are first adjusted to vary the distance between oculars in accordance with the interpupillary distance of the user, by relatively pivoting the two halves about their common pivot. The binoculars are then placed upon the support with their pivot resting in channel 20. At this time, the wings 23 and 24 are in a downward position of adjustment, out of contact with the binoculars and strap 30 is loosely encircling the binoculars. The wings 23 and 24 are now raised until their supporting surfaces are in firm contact with the respective halves of the sighting device, whereupon, screw 29 is turned down until its tapered end engages the adjacent wing surfaces to thereby positively prevent further elevation of the wings. The strap is then tightened about the binoculars to firmly hold their pivot in channel 20 and each half in contact with its wing. The binoculars are thereby not only firmly attached to the support, but also any inadvertent alteration of the interpupillary distance setting is prevented.

The support, with binoculars attached is positioned with legs 6, 7 and 8 resting upon any convenient support and the legs pivoted until base 1 is approximately horizontal as indicated by level 18 which is normally adjacent and just below the oculars. Knob 15 is then turned to free ball 10 from clamped position in its socket. The head 11 and parts carried thereby are now directed upon a target and given a fine adjustment to exactly center the bubble with respect to indicium 18a, after which knob 15 is again tightened. In certain standard models of binoculars such as the Army's types M3, M8, M9, M13 and M15, there is a reticle in the left eyepiece. This reticle is in the form of normally vertical and horizontal scales, offset from the center of the field of view. The horizontal scale is graduated in mils from its center toward each end, usually from 0 to 50 mils, while the vertical scale is graduated in yards, from 0 at the top to about 2000 at its lower end. In addition some models have a vertical mil scale.

Under ordinary battle conditions, firing is directed by arm signals and, when the battery commander uses binoculars simply held to his eyes, it is not only extremely difficult to level the line of sight, but also the binoculars must be released every time a signal is given after which the target must again be picked up. As a result, firing is slowed and valuable time wasted. My invention obviates the foregoing disadvantages. The support, once adjusted, holds the binoculars directed upon the target, leaving the battery commander free to give arm signals as desired and making it unnecessary for him to pick up the target after every signal. The mil scale in the eyepiece being truly horizontal enables rapid and accurate determination of the lateral deflection of the target from an observable aiming point, while if the target is near the horizontal plane through the observation point, the angle of sight and true range adjustments for accurate fire may be quickly determined since the vertical scale is held truly vertical. Furthermore, in the case where legs 6, 7 and 8 are relatively short, say about 6 inches, the binoculars with support attached may be conveniently carried by the usual neck strap provided for the binoculars. The support also acts to hold the interpupillary adjustment fixed against accidental change and, of course, the binoculars, with support attached may be held to the eyes in the ordinary manner of use. Where unusual enemy activity, or snipers, are suspected at a given location, the binoculars may be supported in position directed on that point. The point may then be continuously observed to determine whether it should be fired upon. While I have disclosed my invention as being very useful in warfare, it is by no means limited to such uses but is equally well adapted to other purposes where a binocular support is desired that is solid, easily adjusted to a level or elevated position and, at the same time, holds any given interpupillary adjustment fixed. The parts are preferably made of a light metal such as aluminum, or of any of the well-known plastic materials.

I have disclosed a preferred form of the invention as now known to me. However, numerous substitutions and modifications will occur to those skilled in the art after a study of the present disclosure. For example a vertical scale may be provided on standard 11a adjacent the head of screw 29 for cooperation with radial, circumferentially-spaced graduations on the head of said screw, so that the screw may be given any desired predetermined setting for a known interpupillary adjustment of the binoculars. It is also contemplated that set screw 29 may be replaced by, or supplement, a set screw threaded into a hole in standard 11 to engage one of the shafts 21 or 22 to thereby positively lock the wings in adjusted postions. For this reason, the foregoing description should be taken in an illustrative rather than a limiting sense; and it is my desire to reserve all such changes as fall within the scope of the subjoined claims.

Having now fully disclosed my invention what I claim and desire to secure by Letters Patent is:

1. In a support for a pair of binoculars having right and left halves interpivoted by a pivot joint, a head, a standard carried by said head and having means at its upper end to engage and support said pivot joint, right and left wings each pivoted in said head on an axis parallel to the axis of said joint when so supported, each said wing having a surface adapted to engage and support the said right and left halves, respectively, for all interpivoted adjustments thereof, and means interconnecting said wings for simultaneous equal and opposite pivotal movement.

2. A support for a pair of binoculars having right and left optical halves interconnected by a pivot for interpupillary adjustment, a leveling head, a standard on said head and formed at its upper end to engage and support said pivot, a pair of wings journaled in said head on spaced axes parallel to the pivot of said binoculars when so supported, means interconnecting said wings for simultaneous equal and opposite pivotal movement, each said wing having its upper surface formed to have substantially line contact with the respective halves of said binoculars for all positions of interpupillary adjustment thereof, and means to secure said wings in desired position of upward pivotal adjustment.

3. In a mount for a pair of binoculars having right and left halves interpivoted for interpupillary adjustment, a leveling head including an upright standard having a V-groove at its upper end to engage and support the pivot of said binoculars, first and second shafts journaled in said head on normally horizontally spaced axes, means connecting said shafts for equal and opposite pivotal movement, a supporting wing fixed on each shaft respectively, each said wing having a substantially cylindrical upper supporting surface, whose elements are parallel with said shafts and V-groove, means adjustable to lock said wings in position of upward adjustment, and a single strap adapted to hold said pivot in said V-groove and said halves in contact with the respective wings.

4. A mount for a pair of binoculars having right and left interpivoted halves, a head, a standard secured to and upstanding from said head and having means at its upper end to engage and support the pivot of said binoculars, right and left wings pivoted on said head on normally horizontally spaced axes each parallel to said pivot when the latter is supported on said standard, gearing connecting said wings for equal and opposite pivotal movement, means carried by said head adjustable to variably limit the upward pivotal movement of said wings, level means on said head to indicate a horizontal position of said axes, a base, and a releasable ball and socket joint connection between said base and head.

5. The structure recited in claim 4, the upper surfaces of said wings being formed as upwardly convex substantially cylindrical surfaces whose elements are parallel with the pivot axes thereof, the axes of said surfaces being offset outwardly from the respective shaft axes.

6. Means for supporting a pair of binoculars having right and left optical elements connected by a pivot for relative adjustment about an axis parallel to the optical axes of said elements, said means comprising a head having an upstanding portion adapted adjacent its top, to engage and support said pivot, right and left wings pivoted on said head on parallel horizontally spaced axes below said top, each wing extending outwardly from its axis and having an upper surface formed to engage with the respective elements of said binoculars, means connecting said wings for equal and opposite pivotal adjustment, means carried by said head to adjustably limit the upward pivotal movement of said wings, means to urge said pivot into supported position on said portion and means to hold said wings in upward position of limiting adjustment in contact with the respective elements of said binoculars.

7. A mount for binoculars comprising a head, means on said head to engage and positively support the interconnecting pivot of said binoculars, a pair of oppositely and outwardly extending wings mounted on said head for movement into supporting engagement with respective right and left portions of said binoculars, means adjustably limiting the upward movement of said wings, and means adapted to positively hold said pivot on said support and said wings upwardly in limiting position of adjustment in contact with said portions, respectively.

8. In a mount for binoculars, a base having an upwardly facing hemispherical socket, tripod legs pivoted to and extending downwardly from said base, a head having a depending ball fitting said socket, means releasably clamping said ball and base in relatively adjusted angular position, a standard extending upwardly from said head, there being a normally-horizontal V-channel at the top of said standard to receive and support the pivot of said binoculars, right and left outwardly and oppositely extending wings, each wing having a pair of spaced lugs to receive and embrace said head, a pair of horizontally spaced, parallel shafts each passing through aligned bearing apertures in said respective pairs of lugs, and a respective bearing aperture in said head, each wing being connected with its shaft, identical intermeshing spur gears fixed to each shaft whereby said wings are constrained to equal and opposite angular movement, a set screw threaded in said standard and adapted to engage between said wings to limit upward pivotal movement thereof, a bubble tube level carried by said head to indicate when said V-channel is horizontal, said wings having upwardly convex substantially cylindrical supporting surfaces adapted to engage and support a respective right or left portion of said binoculars, the elements of said surfaces being parallel with the axes of said shafts, strap means adapted to pass upwardly beneath one wing, upwardly between the lugs of said wing, over said pivot, downwardly between the lugs of the other said wing, beneath said other wing, thence over and across said binoculars to the point of beginning, said strap, when tightened acting to hold said pivot in its seat and said wings in limiting upward position in supporting contact with respective said binocular portions, and means securing said strap to the under surface of one wing.

WILLIAM B. LARSON.

REFERENCES CITED

The following references are of record in the file of this patent:

UNITED STATES PATENTS

| Number | Name | Date |
|---|---|---|
| 246,164 | Loiseau | Aug. 23, 1881 |
| 1,831,086 | Zerk | Nov. 10, 1931 |
| 2,015,627 | Hug | Sept. 24, 1925 |